(12) United States Patent
Wu

(10) Patent No.: US 11,381,607 B2
(45) Date of Patent: Jul. 5, 2022

(54) IMS USER REGISTRATION METHOD AND DEVICE

(71) Applicant: DATANG MOBILE COMMUNICATIONS EQUIPMENT CO., LTD., Beijing (CN)

(72) Inventor: Pengcheng Wu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 103 days.

(21) Appl. No.: 16/771,220

(22) PCT Filed: Aug. 27, 2018

(86) PCT No.: PCT/CN2018/102561
§ 371 (c)(1),
(2) Date: Jun. 10, 2020

(87) PCT Pub. No.: WO2019/114320
PCT Pub. Date: Jun. 20, 2019

(65) Prior Publication Data
US 2020/0314153 A1    Oct. 1, 2020

(30) Foreign Application Priority Data
Dec. 14, 2017   (CN) .......................... 201711340166.8

(51) Int. Cl.
*H04L 65/1016*   (2022.01)
*H04L 61/4588*   (2022.01)
(Continued)

(52) U.S. Cl.
CPC ...... *H04L 65/1016* (2013.01); *H04L 61/1588* (2013.01); *H04L 65/1006* (2013.01);
(Continued)

(58) Field of Classification Search
CPC ..... H04W 60/00; H04W 76/10; H04W 12/06; H04W 64/00; H04W 8/26;
(Continued)

(56) References Cited

U.S. PATENT DOCUMENTS 9,451,421 B1    9/2016  Allen et al.
2012/0039312 A1    2/2012  Narkar et al.
(Continued)

FOREIGN PATENT DOCUMENTS

CN    1801706 A    7/2006
CN    1802016 A    7/2006
(Continued)

*Primary Examiner* — Srilakshmi K Kumar
*Assistant Examiner* — Jing Gao
(74) *Attorney, Agent, or Firm* — Kilpatrick Townsend & Stockton, LLP

(57) ABSTRACT

Disclosed are an IMS user registration method and device. The method comprises: after an HSS receives a registration request of a user terminal having no authentication data, acquiring configuration information of the user terminal; obtaining an authentication verification code ResponseHSS by using a random number and an attribute identifier of the user terminal, wherein the attribute identifier comprises an IMSI, an IMEI and an IMS identifier; sending the random number to the user terminal, and receiving a response verification code Response fed back by the user terminal; and determining whether the Response is the same as the ResponseHSS, and if so, sending the registration request to an application server to carry out registration of the user terminal. The technical problem in the prior art of greatly affecting the security of an enterprise network due to the fact that a device used by an IMS user cannot be controlled is solved.

5 Claims, 6 Drawing Sheets

(51) Int. Cl.
*H04L 65/10* (2022.01)
*H04L 65/1073* (2022.01)
*H04W 8/04* (2009.01)
*H04W 12/06* (2021.01)

(52) U.S. Cl.
CPC ........... *H04L 65/1073* (2013.01); *H04W 8/04* (2013.01); *H04W 12/06* (2013.01)

(58) Field of Classification Search
CPC . H04W 12/0431; H04W 12/72; H04W 60/02; H04W 76/16; H04W 88/16; H04W 8/04; H04L 63/08; H04L 61/1511; H04L 61/3085; H04L 61/6054; H04L 63/0272; H04L 63/0281; H04L 63/0435; H04L 63/061; H04L 63/083; H04L 63/0853; H04L 63/0869; H04L 63/162; H04L 65/1006; H04L 65/1016; H04L 65/1043; H04L 65/1073; H04L 61/1588
See application file for complete search history.

(56) References Cited

U.S. PATENT DOCUMENTS

| | | | |
|---|---|---|---|
| 2015/0180671 A1 | 6/2015 | Yamashita | |
| 2017/0012969 A1* | 1/2017 | Li | H04L 63/0838 |
| 2019/0116493 A1* | 4/2019 | Cyril | H04W 12/69 |

FOREIGN PATENT DOCUMENTS

| | | | | |
|---|---|---|---|---|
| CN | 1870822 A | | 11/2006 | |
| CN | 1801706 B | * | 4/2010 | ............ H04L 63/08 |
| CN | 1801706 B | | 4/2010 | |
| CN | 101841812 A | | 9/2010 | |
| CN | 103002566 A | * | 3/2013 | |
| CN | 103002566 A | | 3/2013 | |
| CN | 103155608 A | | 6/2013 | |
| CN | 103929482 A | | 7/2014 | |
| WO | 2017116896 A1 | | 7/2017 | |

* cited by examiner

… (1)

IMS USER REGISTRATION METHOD AND DEVICE

The present application is a US National Stage of International Application No. PCT/CN2018/102561, filed Aug. 27, 2018, which claims priority to Chinese Patent Application No. 201711340166.8, filed with the Chinese Patent Office on Dec. 14, 2017 and entitled "IMS User Registration Method and Device", which is hereby incorporated by reference in its entirety.

FIELD

The present application relates to the field of communication technologies, and particularly to a registration method and device for an IMS user.

BACKGROUND

In the VoLTE (Voice over LTE) and VoIP (Voice over Internet Protocol) processes, the IMS (IP Multimedia Subsystem) device may judge the legitimacy of an IMS user according to the PVI (Private User Identity) or PUI (Public User Identity). The implementation steps of the existing technical solution may be as shown in FIG. 1 and include the following steps.

Step 101: a UE (User Equipment) sends an SIP REGISTER (Session Initiation Protocol REGISTER) request to the discovered P-CSCF (Proxy-Call Session Control Function).

Step 102: the P-CSCF processes the SIP REGISTER request, and sends the SIP REGISTER request to the selected I-CSCF (Interrogating-Call Session Control Function).

Step 103: the I-CSCF sends an SAR (Server Assignment Request) to an HSS (Home Subscriber Server) to query the address of the S-CSCF (Serving CSCF).

Step 104: the HSS selects one S-CSCF and sends the address of the selected S-CSCF to the I-CSCF through an SAA (Server Assignment Answer).

Step 105: the I-CSCF forwards the SIP REGISTER request to the selected S-CSCF.

Step 106: if the S-CSCF finds that the user is not authorized, the S-CSCF sends a UAR (User Authorization Request) to the HSS to obtain the authentication data.

Step 107: the HSS returns the authentication data to the S-CSCF through a UAA (User Authorization Answer).

Step 108: the S-CSCF queries the user with the "401 Unauthorized" response, and sends the response to the I-CSCF.

Step 109: the I-CSCF sends the "401 Unauthorized" response to the P-CSCF.

Step 110: the P-CSCF sends the "401 Unauthorized" response to the UE.

Step 111: the UE may calculate the queried response and send a new REGISTER request to the P-CSCF, where the new REGISTER request contains a response.

Step 112: the P-CSCF may find the I-CSCF again and send the new REGISTER request to the I-CSCF.

Step 113: the I-CSCF sends an SAR to the HSS to query the address of the S-CSCF.

Step 114: the HSS sends the address of the selected S-CSCF to the I-CSCF through an SAA.

Step 115: the I-CSCF forwards the new REGISTER request to the selected S-CSCF.

The S-CSCF checks the response in the new REGISTER request, and if it is incorrect, the authentication fails and the registration process is terminated; if it is correct, the authentication is successful.

Step 116: if the S-CSCF checks the authentication success, it sends an MAR (Multimedia Auth Request) to the HSS.

Step 117: the HSS saves the S-CSCF name corresponding to the UE, and returns a MAA (Multimedia Auth Answer) to the S-CSCF The S-CSCF stores the user information corresponding to the UE.

Step 118: the S-CSCF sends a "200 OK" message to the I-CSCF, indicating that the UE's register request is accepted.

Step 119: the I-CSCF forwards the "200 OK" message to the P-CSCF.

Step 120: the P-CSCF sends the "200 OK" message to the UE.

Step 121: the S-CSCF sends a register request (REGISTER) to an AS (Application Server).

Step 122: the AS returns the "200 OK" message to the S-CSCF, indicating that the registration corresponding to the register request is accepted.

In some occasions where the IMS is used, for safety's sake, an IMS user is required to use IMS on a certain mobile phone. Or, the IMS user is limited to use the IMS only when using a certain USIM (Universal Subscriber Identity Module) on a certain mobile phone terminal. However, according to the above steps of the prior art, it can be known that the prior art can judge the legality of the IMS user, but cannot control the device used by the user. If some terminals use the VoIP client to install on the software, one user can log in on different mobile phone terminals; and at the same time, multiple users can also log in on the same mobile phone terminal. Even the VoIP software may also be installed and logged in on a usual mobile phone terminal without the sending of the enterprise network. This has a great impact on the security of the enterprise network.

SUMMARY

The present application provides a registration method and device for an IMS user, so as to solve the technical problem in the prior art of being unable to control the devices used by the IMS users to thereby greatly affect the security of the enterprise network.

In a first aspect, the present application provides a registration method for an IMS user, including:

obtaining, by a Home Subscriber Server (HSS), configuration information of a user equipment without authentication data after receiving a register request of the user equipment;

determining attribute identifiers corresponding to the user equipment according to the configuration information, and obtaining an authentication verification code (ResponseHSS) based on a random number and the attribute identifiers; wherein the attribute identifiers include an International Mobile Subscriber Identity (IMSI), an International Mobile Equipment Identity (IMEI), and an IP Multimedia Subsystem (IMS) identifier:

sending the random number to the user equipment, and obtaining a response verification code (Response) in a received answer message fed back by the user equipment, wherein the response verification code (Response) is obtained by the user equipment based on the random number;

determining whether the Response is same as the ResponseHSS, and when the Response is same as the ResponseHSS, sending the register request to an application server to register the user equipment.

In an optional implementation, obtaining the authentication verification code (ResponseHSS) based on the random number and the attribute identifiers, includes:

concatenating the IMSI, IMEI and IMS identifier in form of character string, and generating a character string using an MD5 algorithm;

generating a new character string based on the character string and the random number using the MD5 algorithm as the authentication verification code (ResponseHSS).

In an optional implementation, when it is determined that the Response is different from the ResponseHSS, the method further includes:

sending a Multimedia Auth Answer (MAA) carrying a cause value of register request failure to a Serving-Call Session Control Function (S-CSCF); and replying to the user equipment a message indicating that the register request is rejected by the home subscriber server.

In a second aspect, the present application further provides a registration method for an IMS user, which is applied to a user equipment and includes:

sending, by the user equipment, a register request to a Home Subscriber Server (HSS);

receiving a random number sent by the HSS, and generating a response verification code (Response) based on the random number and attribute identifiers corresponding to the user equipment, wherein the attribute identifiers include an International Mobile Subscriber Identity (IMSI), an International Mobile Equipment Identity (IMEI), and an IP Multimedia Subsystem (IMS) identifier;

sending the response verification code (Response) to the HSS, so that the HSS determines, according to the Response, whether to register the user equipment according to the register request.

In an optional implementation, the receiving the random number sent by the HSS includes:

receiving, by the user equipment, the random number from an unauthorized answer sent by a Proxy-Call Session Control Function (P-CSCF).

In a third aspect, the present application provides a home subscriber server, including:

a receiving module configured to obtain the configuration information of a user equipment without authentication data after receiving a register request of the user equipment;

a verification code generation module configured to determine attribute identifiers corresponding to the user equipment according to the configuration information, and obtain an authentication verification code (ResponseHSS) based on a random number and the attribute identifiers; wherein the attribute identifiers include an International Mobile Subscriber Identity (IMSI), an International Mobile Equipment Identity (IMEI), and an IP Multimedia Subsystem (IMS) identifier;

an obtaining module configured to send the random number to the user equipment, and obtain a response verification code (Response) in a received answer message fed back by the user equipment, wherein the response verification code (Response) is obtained by the user equipment based on the random number;

a determining module configured to determine whether the Response is same as the ResponseHSS, and when the Response is same as the ResponseHSS, send the register request to an application server to register the user equipment.

In an optional implementation, the acquisition module is configured to:

concatenate the IMSI, IMEI and IMS identifier in form of character string, and generate a character string using an MD5 algorithm; and generate a new character string based on the character string and the random number using the MD5 algorithm as the authentication verification code (ResponseHSS).

In an optional implementation, the determining module is further configured, when it is determined that the Response is different from the ResponseHSS, to send an MAA carrying a cause value of the register request failure to an S-CSCF; and reply to the user equipment a message indicating that the register request is rejected by the home subscriber server.

In a fourth aspect, the present application further provides a user equipment, including:

a transceiver module configured to send a register request to a Home Subscriber Server (HSS) and receive a random number sent by the HSS;

a generation module configured to generate a response verification code (Response) based on the random number and attribute identifiers corresponding to the user equipment; wherein the attribute identifiers include an International Mobile Subscriber Identity (IMSI), an International Mobile Equipment Identity (IMEI), and an IP Multimedia Subsystem (IMS) identifier.

The transceiver module is further configured to send the response verification code (Response) to the HSS, so that the HSS determines, according to the Response, whether to register the user equipment according to the register request.

In an optional implementation, the transceiver module is configured to receive the random number from an unauthorized answer sent by a P-CSCF.

In a fifth aspect, the present application further provides a home subscriber server, including:

a receiver configured to receive a register request of a user equipment without authentication data;

a processor configured to obtain configuration information of the user equipment, determine attribute identifiers corresponding to the user equipment according to the configuration information, and obtain an authentication verification code (ResponseHSS) based on a random number and the attribute identifiers; wherein the attribute identifiers include an International Mobile Subscriber Identity (IMSI), an International Mobile Equipment Identity (IMEI), and an IP Multimedia Subsystem (IMS) identifier;

a transmitter configured to send the random number to the user equipment;

the receiver is further configured to receive an answer message fed back by the user equipment;

the processor is further configured to obtain a response verification code (Response) in the answer message, wherein the response verification code (Response) is obtained by the user equipment based on the random number, determine whether the Response is same as the ResponseHSS, and when the Response is same as the ResponseHSS, control the transmitter to send the register request to an application server to register the user equipment.

In an optional implementation, the processor is configured to concatenate the IMSI, IMEI and IMS identifier in form of character string, and generate a character string using an MD5 algorithm; and generate a new character string based on the character string and the random number using the MD5 algorithm as the authentication verification code (ResponseHSS).

In an optional implementation, the processor is further configured, when it is determined that the Response is different from the ResponseHSS, to carry a cause value of register request failure in an MAA; and control the transmitter to send the MAA to an S-CSCF, and reply to the user equipment a message indicating that the register request is rejected by the home subscriber server.

In a sixth aspect, the present application further provides a user equipment, including:

a transceiver configured to send a register request to a Home Subscriber Server (HSS), and receive a random number sent by the HSS;

a processor configured to generate a response verification code (Response) based on the random number and attribute identifiers corresponding to the user equipment; wherein the attribute identifiers include an International Mobile Subscriber Identity (IMSI), an International Mobile Equipment Identity (IMEI), and an IP Multimedia Subsystem (IMS) identifier;

the transceiver is further configured to send the response verification code (Response) to the HSS, so that the HSS determines, according to the Response, whether to register the user equipment according to the register request.

In an optional implementation, the transceiver is configured to receive the random number from an unauthorized answer sent by a P-CSCF.

In a seventh aspect, the present application further provides a computer readable storage medium storing the computer instructions, which cause a computer to perform the method described in any optional embodiment in the first or second aspect described above when running on the computer.

The present application has the following beneficial effects.

In the registration method and device for an IMS user provided in the embodiments of the present application, the HSS manages and judges the register request of the user equipment based on the attribute identifiers, and the relevant parameters are transferred in the registration to achieve the access management of the user equipment by the IMS device, so that the management of the accessed user equipment in the enterprise network is more secure and perfect.

DETAILED DESCRIPTION

In the authentication method in the prior art, the HSS cannot bind the EPC (Evolved Packet Core) identifier with the IMS identifier and check them. Therefore, although the prior art can judge the legality of the IMS user, it cannot know the device used by the user and thus cannot control the device used by the user.

In view of the above problem in the prior art, the embodiments of the present application propose a registration method for an IMS user and device. In this method, a Home Subscriber Server (HSS) obtains the configuration information of a user equipment without authentication data after receiving a register request of the user equipment; determines attribute identifiers corresponding to the user equipment according to the configuration information, and obtains an authentication verification code (ResponseHSS) based on a random number and the attribute identifiers; sends the random number to the user equipment, and obtains a response verification code (Response) obtained by the user equipment according to the random number in a received answer message fed back by the user equipment; and determines whether the Response is the same as the ResponseHSS, and if so, sends the register request to an application server to register the user equipment.

Since the method provided in the embodiments of the present application may verify the attribute identifiers corresponding to the user equipment, the enterprise network can control the user equipment accessing the IMS system, so that the user equipment without custom authentication is unable to access the IMS system even if it has installed the VoIP software. Thus, the enterprise network can effectively control the use of the user equipment. It is especially suitable for some scenarios with strict requirements, such as underground coal mine and public security emergency system, where the access network has strict restrictions on the clients accessing it. The method and device provided by the embodiments of the present application will be illustrated below in further detail with reference to the drawings and application scenarios.

First Embodiment

Figure 1:
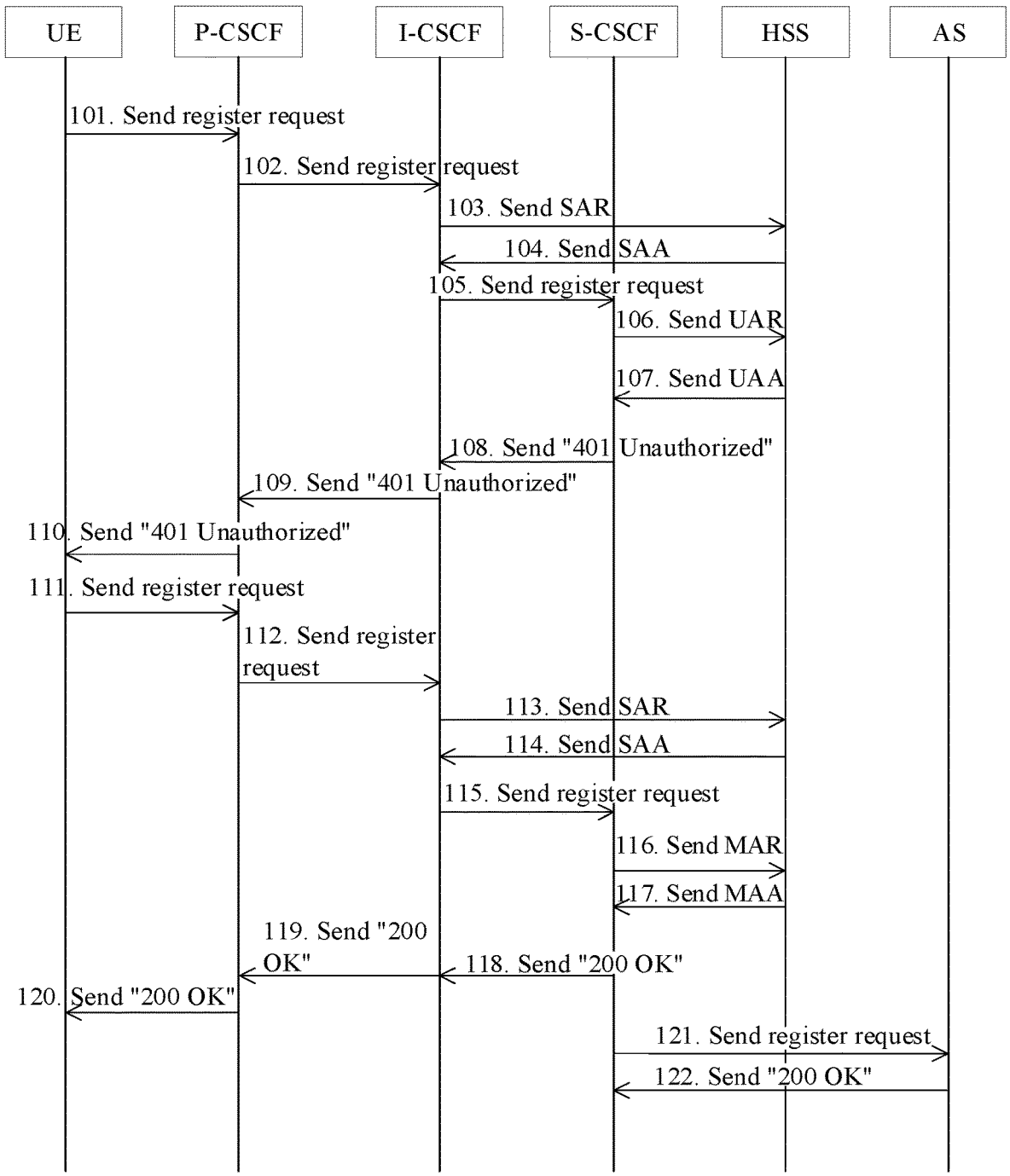
FIG. 1 is a flow schematic diagram of a method of judging the legality of an IMS user in the prior art.
Figure 2:
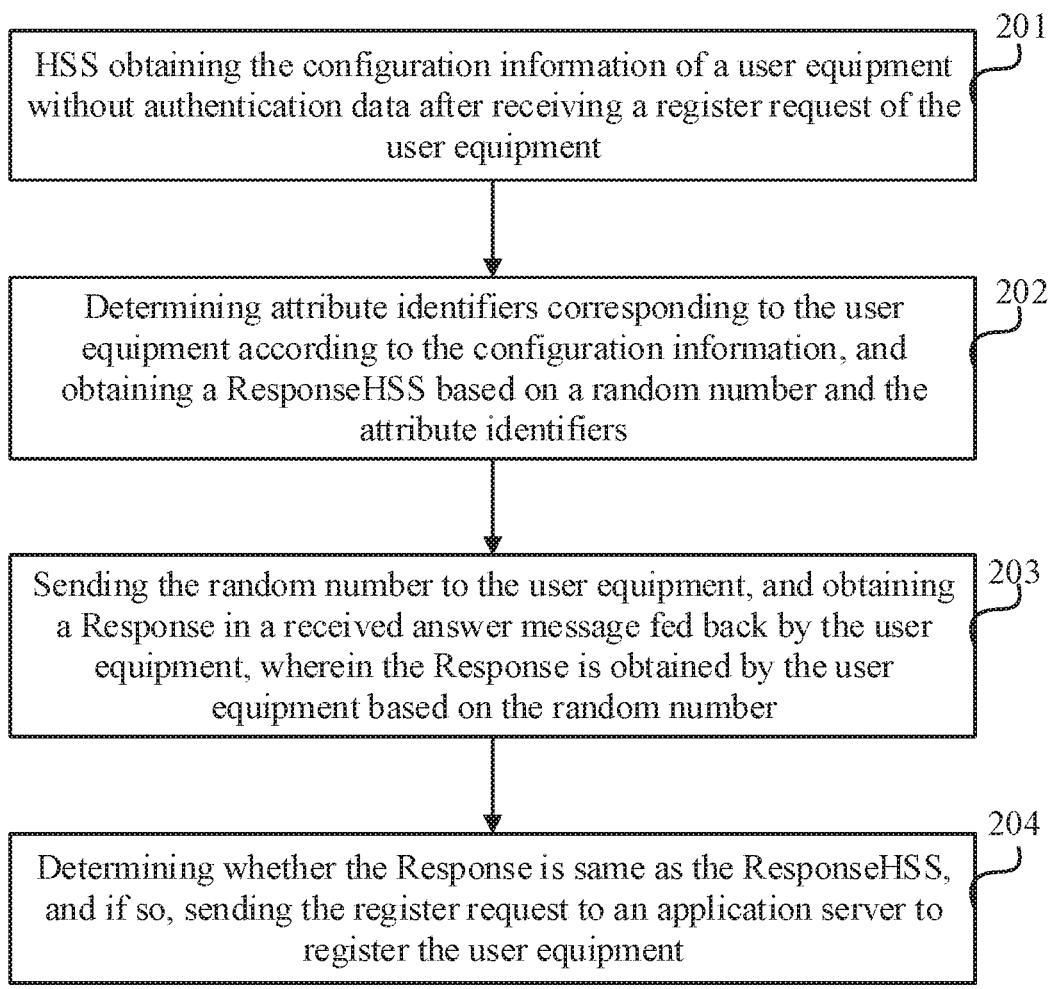
FIG. 2 is a flow schematic diagram of registration method for an IMS user provided by an embodiment of the present application.

A registration method for an IMS user provided by the embodiment of the present application will be further illustrated below in detail in combination with the specification and drawings, and the implementation of this method may include the following steps (the method flow is shown in FIG. 2).

Step 201: an HSS obtains the configuration information of a user equipment without authentication data after receiving a register request of the user equipment.

Step 202: determining attribute identifiers corresponding to the user equipment according to the configuration information, and obtaining an authentication verification code (ResponseHSS) based on a random number and the attribute identifiers; wherein the attribute identifiers include an International Mobile Subscriber Identification Number, an International Mobile Equipment Identity, and an IP Multimedia Subsystem (IMS) identifier.

Here, the IMSI, IMEI, and IP Multimedia Subsystem (IMS) identifier (including: PVI and PUI) included in the attribute identifiers may be used in combination, where any combination needs to be able to determine the user equipment that accesses the network.

The authentication verification code (ResponseHSS) based on the random number and the attribute identifiers may be obtained in the following way.

In an embodiment of the present application, the correspondence among the attribute identifiers may be set in advance in the HSS based on the types of the above attribute identifiers, and the correspondence among the IMSI, IMEI, and PVI and PUI in IMS identifier that may be set based on the types of the above attribute identifiers is as shown in Table 1:

TABLE 1

| | |
|---|---|
| PVI | sip: 460001004202567@ims.mnc000.mcc460.3gppnetwork.org |
| PUI | tel: 13400000002; phone-context = ims.mnc000.mcc460.3gppnetwork.org |
| IMSI | 460001004202567 |
| IMEI | 861414030072400 |

Then the HSS generates a random number (RANDcheck), and sends the RANDcheck along with the check mark to the user equipment; and the RANDcheck may consist of a random string in this embodiments.

After receiving the RANDcheck, the user equipment uses the random number to calculate the Response if the check mark is detected, where the calculation method is as follows:

A: concatenating the IMSI, IMEI and IMS identifier in character string and generating a character string (HA1) using the MD5 algorithm (Message Digest Algorithm 5);

HA1=md5 ("PVI:IMSI:IMEI");

B: generating a new character string based on the character string and the random number using the MD5 algorithm as the authentication verification code (ResponseHSS).

ResponseHSS=md5 ("HA1: RANDcheck").

Step 203: sending the random number to the user equipment, and obtaining a response verification code (Response) in a received answer fed back by the user equipment, wherein the response verification code (Response) is obtained by the user equipment based on the random number.

Step 204: determining whether the Response is same as the ResponseHSS, and if so, sending the register request to an application server to register the user equipment.

Further, if it is determined that the Response is different from the ResponseHSS, the method further includes:

sending an MAA carrying a cause value of the register request failure to an S-CSCF; and replying a message to the user equipment indicating that the register request is rejected by the home subscriber server.

Second Embodiment

Figure 3:
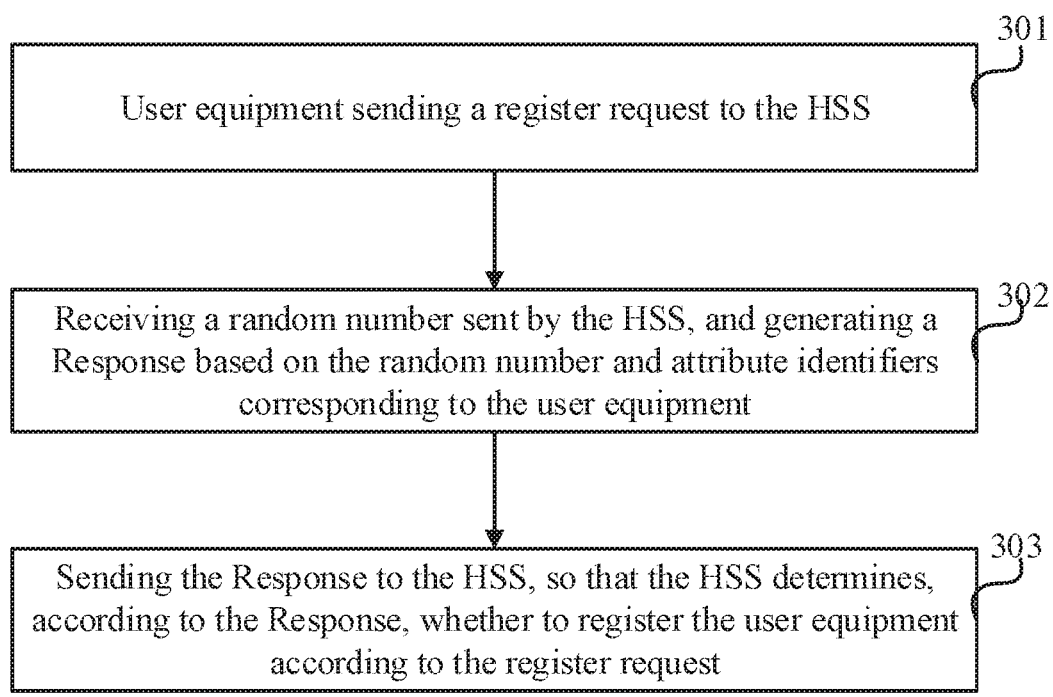
FIG. 3 is a flow schematic diagram of another registration method for an IMS user provided by an embodiment of the present application.

As shown in FIG. 3, an embodiment of the present application further provides another registration method for an IMS user, which is applied to an user equipment, the user equipment is provided with a communication module. The method includes the following steps.

Step 301: the user equipment sends a register request to the HSS.

Step 302: receiving a random number sent by the HSS, and generating a response verification code (Response) based on the random number and attribute identifiers corresponding to the user equipment; wherein the attribute identifiers include an IMSI, an IMEI, and an IMS identifier.

In a specific application scenario, the user equipment may receive the random number from an unauthorized answer sent by the P-CSCF Step 303: sending the Response to the HSS, so that the HSS determines, based on the Response, whether to register the user equipment according to the register request.

Third Embodiment

Figure 4:
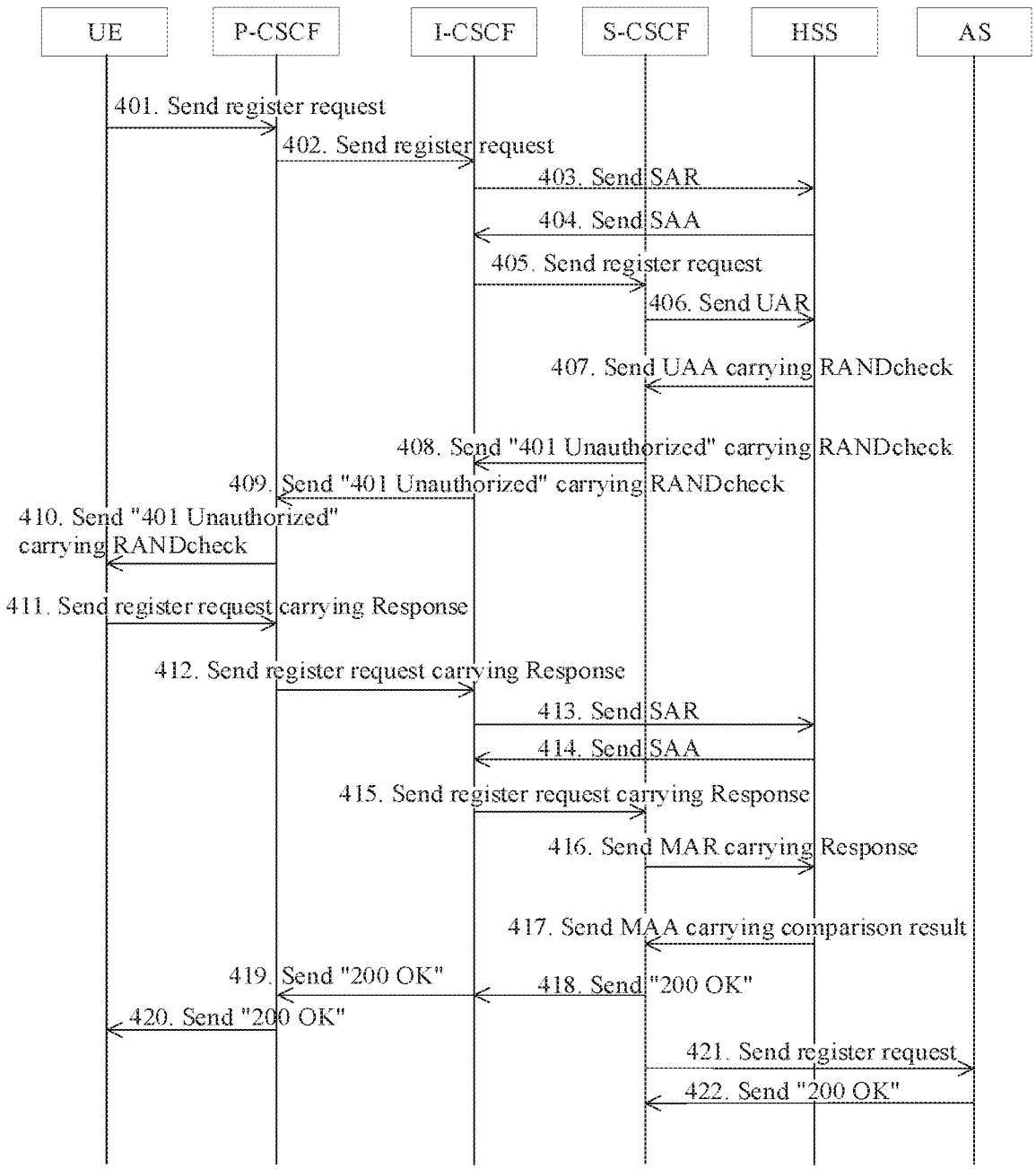
FIG. 4 is a flow schematic diagram of applying a registration method for an IMS user in an actual network architecture provided by an embodiment of the present application.

The first and second embodiments are the methods provided by the embodiments of the present application based on different devices. In order to illustrate the specific use of the method provided by the embodiments of the present application in a specific application environment more clearly and detailedly, the registration method for the IMS user provided by the embodiments of the present application will be illustrated below based on the combination of the first and second embodiments as well as the specific network architecture (specific devices include: UE, P-CSCF, I-CSCF, S-CSCF, HSS, AS). The method may specifically (as shown in FIG. 4) includes the following steps.

Step 401: the UE sends an SIP REGISTER request to the discovered P-CSCF.

Step 402: the P-CSCF processes the received SIP REGISTER request, and sends the SIP REGISTER request to the selected I-CSCF.

Step 403: the I-CSCF contacts the HSS after receiving the SIP REGISTER request, and sends an SAR to the HSS to query the address of the S-CSCF.

Step 404: the HSS selects an S-CSCF, and sends the address of the selected S-CSCF to the I-CSCF through an SAA.

Step 405: the I-CSCF forwards the SIP REGISTER request to the selected S-CSCF after receiving the address of the S-CSCF selected by the HSS.

Step 406: the S-CSCF sends a UAR to the HSS to obtain the authentication data when the S-CSCF determines that the user is not authorized.

After receiving the UAR, the HSS checks the configuration information of the user. If there is a correspondence table of IMSI, IMEI, and PVI in the IMS identifier, the HSS generates a random number (RANDcheck), and generates the ResponseHSS according to the random number calculation method provided by the embodiment and stores after the calculation. The HSS passes the RANDcheck to the S-CSCF.

Step 407: the HSS returns the authentication data to the S-CSCF through a UAA carrying the RANDcheck.

Step 408: the S-CSCF uses the "401 Unauthorized" response to query the user regardless of whether the corresponding authentication method configured by the user is Digest or AKA after receiving the RANDcheck carried in the UAA, and passes a message to the I-CSCF, where the message carries the RANDcheck.

Step 409: the I-CSCF sends the "401 Unauthorized" message to the P-CSCF, where the message carries the RANDcheck.

Step 410: the P-CSCF sends the "401 Unauthorized" message to the UE, where the message carries the RANDcheck.

Step 411: the UE calculates the response and sends a new REGISTER request including this response to the P-CSCF, the UE calculates the Response based on the received RANDcheck and its own PVI, IMSI and IMEI, and sends the Response in the new REGISTER request.

Step 412: the P-CSCF selects an I-CSCF and sends the new REGISTER request to the selected I-CSCF Step 413: the I-CSCF sends an SAR to the HSS to query the address of the S-CSCF after receiving the new REGISTER request.

Step 414: the HSS sends the address of the selected S-CSCF to the I-CSCF through an SAA after receiving the SAR.

Step 415: the I-CSCF forwards the new REGISTER request to the S-CSCF selected by the HSS.

The S-CSCF checks the response fed back by the UE according to the new REGISTER request, and if it is incorrect, the authentication fails and the registration process is terminated; if it is correct, the authentication is successful.

Step 416, if the S-CSCF checks the authentication success, the S-CSCF sends an MAR to the HSS, and passes the Response carried in the new REGISTER request to the HSS through the MAR.

Step 417: the HSS stores the S-CSCF name corresponding to the user, and checks whether the Response is the same as the previously calculated ResponseHSS.

If the Response is the same as the ResponseHSS calculated in step 6, the user matches the equipment successfully; if they are not same, the user fails to match the equipment, and it can be determined that the user does not use the specified USIM card and the specified user equipment. The IMS device rejects the user's registration.

The HSS sends an MAA to the S-CSCF. The MAA carries the matching result. If the matching fails, the HSS carries the failure cause value in the MAA, and the newly defined cause value is:

DIAMETER_ERROR_RESTRICT_IMSI_IMEI_ERROR (5013).

Step 418: if the matching result is success, the S-CSCF sends a "200 OK" message to the I-CSCF, indicating that this registration is accepted; if the S-CSCF returns the 202 message to the UE after receiving the failure cause value, this registration is not accepted by the server, and the process ends; if the message is the "200 OK" message, the process proceeds to step 421.

Step 419: the I-CSCF forwards the "200 OK" message or 202 message to the P-CSCF.

Step 420: the P-CSCF sends the "200 OK" message or 202 message to the UE; if it is the 202 message, the process ends.

Step 421: the S-CSCF sends the register request (REGISTER) to an AS.

Step 422: the AS returns the "200 OK" message to the S-CSCF, indicating that this registration is accepted.

Fourth Embodiment

Figure 5:
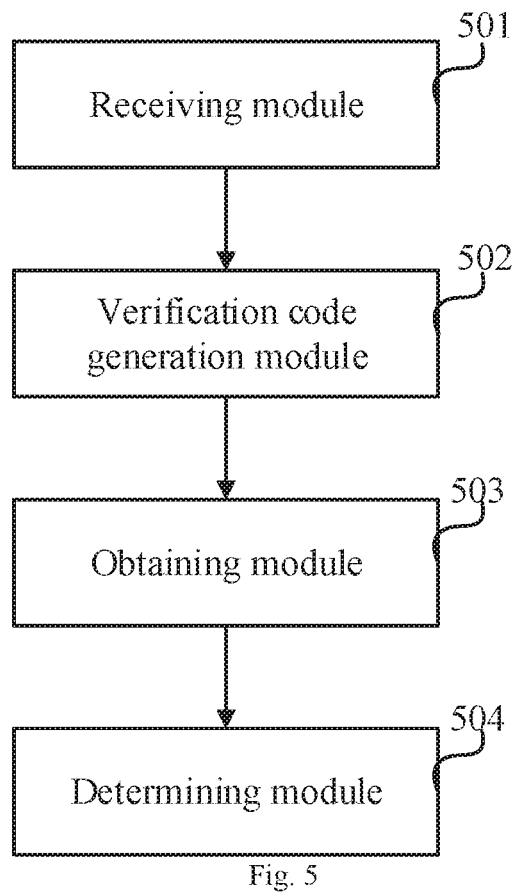
FIG. 5 is a schematic structural diagram of a home subscriber server provided by an embodiment of the present application.

As shown in FIG. 5, an embodiment of the present application further provides a home subscriber server, which may include:

a receiving module 501 configured to obtain the configuration information of a user equipment without authentication data after receiving a register request of the user equipment;

a verification code generation module 502 configured to determine attribute identifiers corresponding to the user equipment according to the configuration information, and obtain an authentication verification code (ResponseHSS) based on a random number and the attribute identifiers; wherein the attribute identifiers include an IMSI, an IMEI and an IMS identifier;

an obtaining module 503 configured to send the random number to the user equipment, and obtain a response verification code (Response) in a received answer message fed back by the user equipment, wherein the response verification code (Response) is obtained by the user equipment based on the random number.

In the existing implementations, the obtaining module may obtain the response verification code (Response) in various ways. In the embodiments of the present application, the obtaining module 503 may be configured to:

concatenate the IMSI. IMEI and IMS identifier in form of character string, and generate a character string using an MD5 algorithm; and generate a new character string based on the character string and the random number using the MD5 algorithm as the authentication verification code (ResponseHSS).

A determining module 504 is configured to determine whether the Response is same as the ResponseHSS, and when the Response is same as the ResponseHSS, send the register request to an application server to register the user equipment.

When it is determined that the Response is different from the ResponseHSS, the register request is rejected, and correspondingly the determining module 504 is further configured to send an MAA carrying a cause value of the register request failure to an S-CSCF; and reply a message indicating that the register request is rejected by the home subscriber server to the user equipment.

Fifth Embodiment

Figure 6:
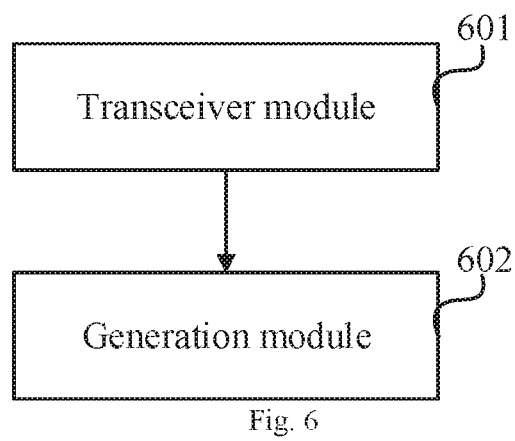
FIG. 6 is a schematic structural diagram of a user equipment provided by an embodiment of the present application.

As shown in FIG. 6, an embodiment of the present application further provides a user equipment, which is provided with a communication module and further includes:

a transceiver module 601 configured to send a register request to an HSS and receive a random number sent by the HSS.

Optionally, the transceiver module 601 is configured to receive the random number from an unauthorized answer sent by the P-CSCF.

A generation module 602 is configured to generate a response verification code (Response) based on the random number and attribute identifiers corresponding to the user equipment; wherein the attribute identifiers include an IMSI, an IMEI and an IMS identifier.

The transceiver module 601 is further configured to send the response verification code (Response) to the HSS, so that the HSS determines, according to the Response, whether to register the user equipment according to the register request.

Sixth Embodiment

Figure 7:
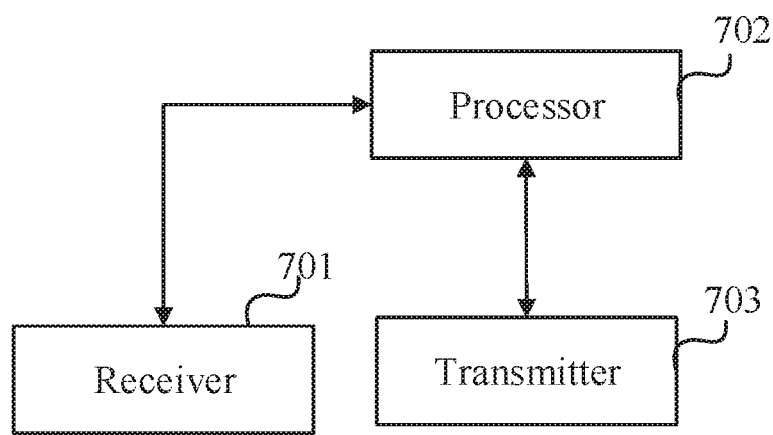
FIG. 7 is a schematic structural diagram of another home subscriber server provided by an embodiment of the present application.

As shown in FIG. 7, an embodiment of the present application further provides a home subscriber server, which may include:

a receiver 701 configured to receive a register request of a user equipment without authentication data;

a processor 702 configured to obtain the configuration information of the user equipment, determine attribute identifiers corresponding to the user equipment according to the configuration information, and obtain an authentication verification code (ResponseHSS) based on a random number and the attribute identifiers; wherein the attribute identifiers include an IMSI, an IMEI and an IMS identifier;

a transmitter 703 configured to send the random number to the user equipment.

The receiver 701 is further configured to receive an answer message fed back by the user equipment.

Then, the processor 702 is further configured to obtain a response verification code (Response) in the answer message, wherein the response verification code (Response) is obtained by the user equipment based on the random number.

In the existing implementations, the processor 702 may obtain the response verification code (Response) in various ways. In the embodiments of the present application, the processor 702 may configured to:

concatenate the IMSI, IMEI and IMS identifier in form of character string, and generate a character string using an MD5 algorithm; and generate a new character string based on the character string and the random number using the MD5 algorithm as the authentication verification code (ResponseHSS).

The processor 702 is configured to determine whether the Response is same as the ResponseHSS, and when the Response is same as the ResponseHSS, control the transmitter 703 to send the register request to an application server to register the user equipment.

When it is determined that the Response is different from the ResponseHSS, the register request is rejected, and correspondingly the processor 702 is further configured to carry a cause value of the register request failure in an MAA, and control the transmitter to send the MAA to the S-CSCF; and reply to the user equipment a message indicating that the register request is rejected by the home subscriber server.

In the embodiments of the present application, the receiver 701 and the transmitter 703 may be integrated into one module (transceiver) to centrally implement the functions of sending and receiving the data information in the home subscriber server, or may be divided into two independent modules to respectively realize the functions of sending and receiving the information.

Fifth Embodiment

Figure 8:
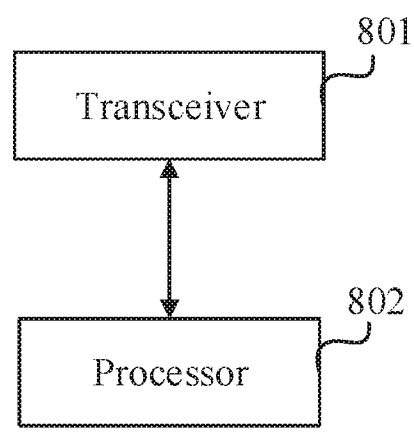
FIG. 8 is a schematic structural diagram of another user equipment provided by an embodiment of the present application.

As shown in FIG. 8, an embodiment of the present application further provides a user equipment, including: a transceiver 801 and a processor 802.

The transceiver 801 is configured to send a register request to an HSS and receive a random number sent by the HSS.

Optionally, the transceiver 801 is configured to receive the random number from an unauthorized answer sent by the P-CSCF.

The processor 802 is configured to generate a response verification code (Response) based on the random number and attribute identifiers corresponding to the user equipment; wherein the attribute identifiers include an IMSI, an IMEI and an IMS identifier.

The transceiver 801 is further configured to send the response verification code (Response) to the HSS, so that the HSS determines, according to the Response, whether to register the user equipment according to the register request.

In the embodiments of the present application, the transceiver 801 may be one module that centrally implements the functions of sending and receiving the data information of the user equipment, or may be divided into two independent modules, i.e., receiver and transmitter, that respectively implement the functions of sending and receiving the information of the user equipment.

Based on the same inventive concept, an embodiment of the present application further provides a computer readable storage medium storing the computer instructions, which cause a computer to perform the registration method for the IMS user in the first or second embodiment of the present application when running on the computer.

In the registration method and device for the IMS user provided in the embodiments of the present application, the HSS manages and judges the register request of the user equipment based on the attribute identifiers, and the relevant parameters are transferred in the registration to achieve the access management of the user equipment by the IMS device, so that the management of the accessed user equipment in the enterprise network is more secure and perfect.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the application without departing from the spirit and scope of the application. Thus the application is also intended to encompass these modifications and variations therein as long as these modifications and variations come into the scope of the claims of the application and their equivalents.

The invention claimed is:

1. A registration method for an IP Multimedia Subsystem (MS) user, comprising:
obtaining, by a Home Subscriber Server (HSS), configuration information of a user equipment without authentication data after receiving a register request from the user equipment;
determining attribute identifiers corresponding to the user equipment according to the configuration information; wherein the attribute identifiers comprise an International Mobile Subscriber Identity (IMSI), an International Mobile Equipment Identity (IMEI) and an IMS identifier;
concatenating the IMSI, IMEI and IMS identifier in form of character string, and generating a character string using an MD5 algorithm base on the concatenated IMSI, IMEI and IMS identifier;

generating a new character string based on the character string and a random number using the MD5 algorithm as an authentication verification code ResponseHSS;

sending the random number to a Serving-Call Session Control Function, S CSCF, through the User Authorization Answer, UAA, to cause the S-CSCE send an unauthorized answer to the user equipment;

obtaining a response verification code Response in a received answer message fed back by the user equipment, wherein the response verification code Response is obtained by the user equipment based on the random number and the attribute identifiers;

determining whether the Response is same as the ResponseHSS, and when the Response is same as the ResponseHSS, sending the register request to an application server to register the user equipment.

2. The method according to claim 1, wherein when it is determined that the Response is different from the ResponseHSS, the method further comprises:

sending a Multimedia Auth Answer (MAA) carrying a cause value of register request failure to the S-CSCF; and replying to the user equipment a message indicating that the register request is rejected by the HSS.

3. A non-transitory storage medium, wherein the storage medium is a non-volatile computer readable storage medium storing at least one program, wherein each program comprises instructions that, when executed by an electronic device having a processor, cause the electronic device to perform the method of claim 1.

4. A home subscriber server (HSS), comprising:
a receiver configured to receive a register request from a user equipment without authentication data;
a processor configured to:
obtain configuration information of the user equipment;
determine attribute identifiers corresponding to the user equipment according to the configuration information;

wherein the attribute identifiers comprise an international Mobile Subscriber Identity IMSI), an International Mobile Equipment Identity (IMEI), and an IP Multimedia Subsystem (IMS) identifier;

concatenate the IMSI, IMEI and IMS identifier in form of character string, and generate a character string using an MD5 algorithm base on the concatenated IMSI, IMEI and IMS identifier; and generate a new character string based on the character string and a random number using the MD5 algorithm as an authentication verification code ResponseHSS;

a transmitter configured to:
send the random number to a Serving-Call Session Control Function, S-CSCF, through the User Authorization Answer, UAA, to cause the S-CSCE send an unauthorized answer to the user equipment;

the receiver is further configured to receive an answer message fed back by the user equipment; the processor is further configured to obtain a response verification code (Response) in the answer message, wherein the response verification code Response is obtained by the user equipment based on the random number and the attribute identifiers; determine whether the Response is same as the ResponseHSS, and when the Response is same as the ResponseHSS, control the transmitter to send the register request to an application server to register the user equipment.

5. The home HSS according to claim 4, wherein the processor is further configured, when it is determined that the Response is different from the ResponseHSS, to carry a cause value of register request failure in a Multimedia Auth Answer (MAA); and control the transmitter to send the MAA to the S-CSCF, and reply to the user equipment a message indicating that the register request is rejected by the HSS.

\* \* \* \* \*